(12) United States Patent
Ooba (10) Patent No.: US 10,045,009 B2
(45) Date of Patent: *Aug. 7, 2018

(54) IMAGING DEVICE AND IMAGING CONTROL METHOD WITH ADJUSTABLE FRAME FREQUENCY

(71) Applicant: Sony Corporation, Tokyo (JP)

(72) Inventor: Yuuji Ooba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 15/076,893

(22) Filed: Mar. 22, 2016

(65) Prior Publication Data

US 2016/0227198 A1 Aug. 4, 2016

Related U.S. Application Data

(63) Continuation of application No. 13/486,456, filed on Jun. 1, 2012, now Pat. No. 9,338,436.

(30) Foreign Application Priority Data

Jun. 7, 2011 (JP) .................................. 2011-127414

(51) Int. Cl.
*H04N 13/02* (2006.01)
*H04N 5/225* (2006.01)
(Continued)

(52) U.S. Cl.
CPC ....... *H04N 13/0296* (2013.01); *H04N 5/0733* (2013.01); *H04N 5/2258* (2013.01);
(Continued)

(58) Field of Classification Search
CPC ............... H04N 5/23203; H04N 5/232; H04N 5/23206; H04N 5/2258; H04N 5/2353;
(Continued)

(56) References Cited

U.S. PATENT DOCUMENTS 6,493,034 B1 12/2002 Elberbaum
6,774,935 B1 8/2004 Morimoto et al.
(Continued)

FOREIGN PATENT DOCUMENTS

JP 10-210506 8/1998
JP 2000-341719 12/2000
(Continued)

OTHER PUBLICATIONS

Office Action issued in corresponding Japanese application No. 2011-127414 dated Feb. 10, 2015.

*Primary Examiner* — Michael Osinski
(74) *Attorney, Agent, or Firm* — Haug Partners LLP; William S. Frommer (57) ABSTRACT

A first imaging device and a second image device are connected with each other in a communicatable manner, and data of imaging timing and data of an exposure period of the first imaging device are transmitted to the second imaging device. In the second imaging device, the imaging timing and the exposure period can be set based on the data of the imaging timing and the data of the exposure period which are received. Therefore, an image is taken by the first imaging device and the second imaging device with the imaging timing and the exposure period of the first imaging device agreeing with those of the second imaging device.

20 Claims, 10 Drawing Sheets

(51) Int. Cl.
*H04N 5/073* (2006.01)
*H04N 5/235* (2006.01)
*H04N 5/232* (2006.01)

(52) U.S. Cl.
CPC ....... *H04N 5/2353* (2013.01); *H04N 5/23245* (2013.01); *H04N 13/0239* (2013.01)

(58) Field of Classification Search
CPC ........... H04N 13/0239; H04N 13/0296; H04N 13/0048; H04N 13/0051; H04N 13/0055; H04N 13/0242; H04N 5/247; H04N 5/3765; H04N 5/0733; H04N 5/23245; H04N 5/35554; H04N 5/374; G03B 35/08
See application file for complete search history.

(56) References Cited

U.S. PATENT DOCUMENTS

| | | | |
|---|---|---|---|
| 7,046,292 B2 | 5/2006 | Ziemkowski | |
| 7,511,737 B2 | 3/2009 | Singh | |
| 8,018,512 B2 * | 9/2011 | Ito | H04N 5/3532 348/296 |
| 8,456,535 B2 | 6/2013 | Shinomiya | |
| 9,749,566 B2 * | 8/2017 | Yoneda | H04N 5/374 |
| 2002/0118958 A1 | 8/2002 | Ishikawa et al. | |
| 2002/0135682 A1 | 9/2002 | Oka et al. | |
| 2003/0011683 A1 | 1/2003 | Yamasaki et al. | |
| 2003/0133018 A1 | 7/2003 | Ziemkowski | |
| 2003/0160870 A1 | 8/2003 | Ziemkowski | |
| 2004/0183915 A1 | 9/2004 | Gothoda et al. | |
| 2005/0077450 A1 | 4/2005 | Baer | |
| 2006/0065915 A1 | 3/2006 | Kuwazawa | |
| 2006/0158526 A1 | 7/2006 | Kashiwa et al. | |
| 2006/0261282 A1 | 11/2006 | Nakajima | |
| 2007/0223901 A1 | 9/2007 | Fujimoto | |
| 2007/0283031 A1 | 12/2007 | Yoshida | |
| 2008/0232780 A1 | 9/2008 | Yamada | |
| 2008/0252765 A1 * | 10/2008 | Ito | H04N 5/3532 348/308 |
| 2009/0015689 A1 | 1/2009 | Murayama | |
| 2009/0135262 A1 | 5/2009 | Ogasawara | |
| 2009/0153694 A1 * | 6/2009 | Takayama | G06T 3/4053 348/222.1 |
| 2009/0303337 A1 | 12/2009 | Kaneko et al. | |
| 2010/0134651 A1 | 6/2010 | Morimoto | |
| 2010/0157020 A1 | 6/2010 | Choi | |
| 2010/0245649 A1 * | 9/2010 | Nitta | H03M 1/1023 348/308 |
| 2010/0289914 A1 | 11/2010 | Shinomiya | |
| 2010/0309305 A1 * | 12/2010 | Nakatsuka | H04N 5/2352 348/79 |
| 2011/0019071 A1 * | 1/2011 | Amano | H04N 5/2329 348/363 |
| 2011/0096216 A1 * | 4/2011 | Kawai | G03B 7/091 348/296 |
| 2011/0128433 A1 * | 6/2011 | Shiohara | H04N 5/23293 348/333.09 |
| 2011/0205380 A1 | 8/2011 | Shirakawa | |
| 2011/0242342 A1 | 10/2011 | Goma | |
| 2011/0242368 A1 * | 10/2011 | Haneda | H04N 5/235 348/239 |
| 2011/0242370 A1 | 10/2011 | Endo | |
| 2011/0267269 A1 | 11/2011 | Tardif et al. | |
| 2012/0092542 A1 * | 4/2012 | Kitano | H04N 5/23293 348/333.01 |
| 2012/0113230 A1 | 5/2012 | Jin | |
| 2012/0127337 A1 * | 5/2012 | Okada | H04N 5/3537 348/223.1 |
| 2012/0154609 A1 | 6/2012 | Ozaki | |
| 2012/0162490 A1 * | 6/2012 | Chung | H04N 5/232 348/333.01 |
| 2012/0162511 A1 | 6/2012 | Hewes et al. | |
| 2012/0242805 A1 | 9/2012 | Tyou | |
| 2012/0257022 A1 | 10/2012 | Suto et al. | |
| 2012/0300124 A1 | 11/2012 | Yamashita | |
| 2013/0021450 A1 | 1/2013 | Yoshizawa | |
| 2013/0314586 A1 * | 11/2013 | Shimamoto | G02B 7/38 348/348 |
| 2017/0188013 A1 * | 6/2017 | Presler | H04N 13/0239 |

FOREIGN PATENT DOCUMENTS

| | | |
|---|---|---|
| JP | 2005-039707 | 2/2005 |
| JP | 2010-028484 | 2/2010 |
| JP | 2010-277033 | 12/2010 |

\* cited by examiner

FIG.2

EXAMPLE OF PROCESSING BY MASTER

FIG.3

EXAMPLE OF PROCESSING BY SLAVE

FIG.8

SYSTEM EXAMPLE

Fig. 9A SHUTTER PULSE

Fig. 9B SHUTTER PULSE (INVERTED)

Fig. 9C ACTIVATION PULSE

Fig. 9D COUNT OPERATION1

Fig. 9E COUNT OPERATION2

EXAMPLE OF ANALOG PULSE

IMAGING DEVICE AND IMAGING CONTROL METHOD WITH ADJUSTABLE FRAME FREQUENCY

This is a continuation of application Ser. No. 13/486,456, filed Jun. 1, 2012, which is entitled to the priority filing date of Japanese application number 2011-127414, filed Jun. 7, 2011, the entirety of which is incorporated herein by reference.

BACKGROUND

The present disclosure relates to an imaging device and an imaging method, and more particularly, to a technique used upon taking a stereoscopic image (3D image).

When a stereoscopic image is taken by an imaging device such as a video camera, two imaging devices are used. Then, an image for left channel and an image for right channel are individually taken by the respective imaging devices. In this case, the two imaging devices are fixed by a coupling mechanism called a rig, and an image is taken so that optical axes of a lens unit attached to, each imaging device become parallel to each other.

When an image is taken with the use of the two imaging devices like this, an image signal output from each imaging device is in synchronizing timing. For example, a reference synchronizing signal from a reference synchronizing signal generator is supplied to each imaging device, and synchronizing timing of an image signal (video signal) output from each imaging device agrees with each other.

Japanese Patent Laid-Open No. 10-210506 describes an example of a configuration in which a stereoscopic image is taken with the use of two imaging devices.

SUMMARY

When a plurality of imaging devices are used and a reference synchronizing signal is supplied to each imaging device, an image signal output itself which is taken and output is a synchronizing signal. However, in a system using a reference synchronizing signal of a related art, processing timing in each imaging device is not specified and a signal has not necessarily been taken at the same timing.

Especially, when a variable speed imaging is performed in which a frame period for imaging is changed, it has been highly likely that timing at which an imager included in the imaging device takes an image and timing at which a shutter mechanism exposes or shields light are different between the two imaging devices.

If imaging timing and the like are different between the two imaging devices, a stereoscopic image to be created will be an image taken at different timing between left channel and right channel. Therefore, when a high speed scene is taken, for example, a rough image is created.

It is desirable to realize a synchronized imaging when a stereoscopic image is taken by two imaging devices.

In the present disclosure, a first imaging device and a second imaging device are connected with each other in a communicatable manner, and data of imaging timing and data of an exposure period of the first imaging device are transmitted to the second imaging device.

By adopting this configuration, the second imaging device can set imaging timing and an exposure period based on the received data of the imaging timing and data of the exposure period. Therefore, an image is taken with the imaging timing and the exposure period of the first imaging device agreeing with those of the second imaging device.

According to the present disclosure, an image can be taken with the imaging timing and the exposure period of one imaging device agreeing with those of the other imaging device by communicating the imaging timing and the exposure period between two imaging devices; therefore, an appropriate image signal as a stereoscopic image signal is obtained. Especially, a synchronized imaging can be taken even when a variable speed imaging, in which a frame period for imaging is changed, is performed.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

An embodiment of the present disclosure will be described in the following order: 1. Configuration of imaging device (FIG. 1); 2. Example of processing by master imaging device (FIG. 2); 3. Example of processing by slave imaging device (FIG. 3); 4. Example of imaging state (FIGS. 4, 5, 6, and 7); 5. Example when analog shutter pulse is input (FIGS. 8, 9, and 10); and 6. Modification.

[1. Configuration of Imaging Device]

A configuration of an imaging device according to an embodiment of the present disclosure (hereinafter referred to as "the embodiment") will be described with reference to FIG. 1.

Figure 1:
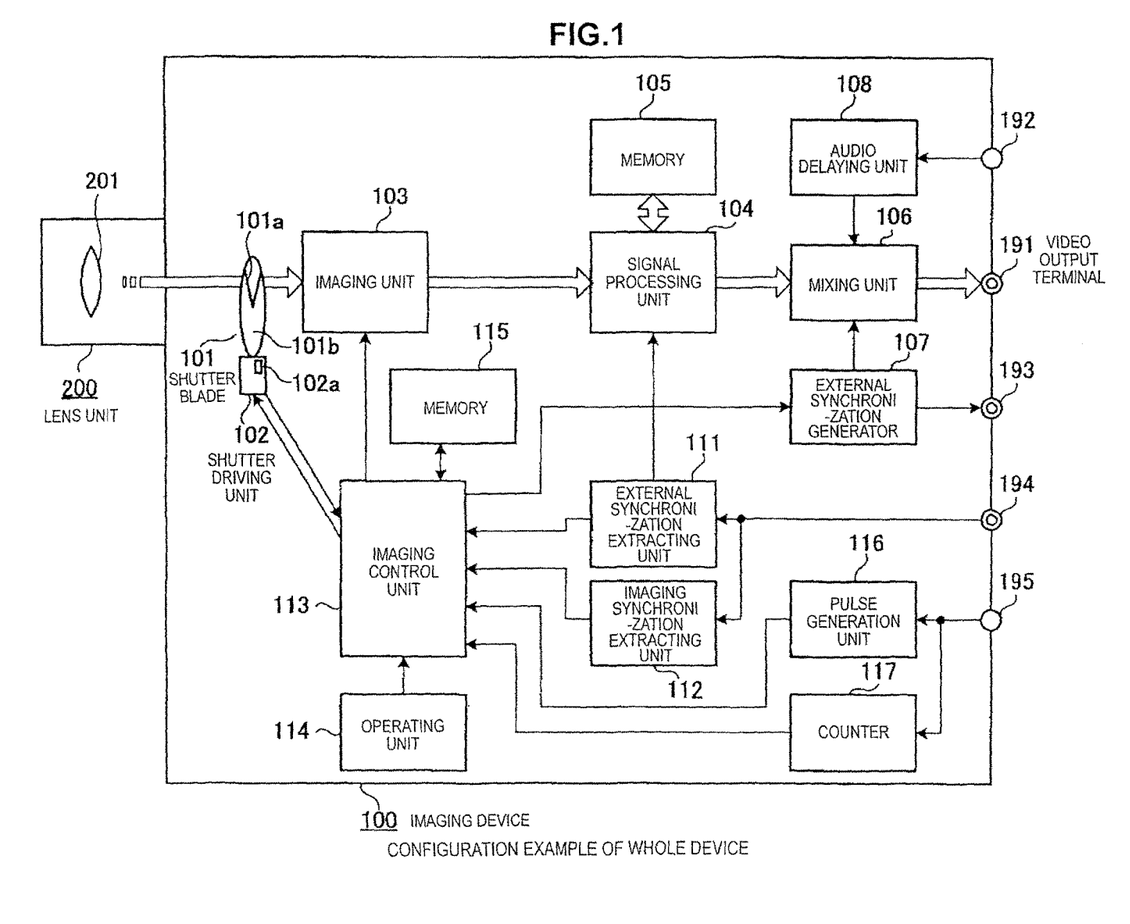
FIG. 1 is a diagram illustrating a configuration of an imaging device according to an embodiment of the present disclosure.

FIG. 1 is a diagram illustrating a configuration of an imaging device according to the embodiment.

An imaging device 100 has an image sensor and an imaging unit 103 including a circuit for reading out an image signal from the image sensor and the like. The image sensor included in the imaging unit 103 converts image light incident through a lens 201 of a lens unit 200 attached to the imaging device 100 into an electrical image signal. Imaging timing and an imaging period at the imaging unit 103 are controlled by an imaging control unit 113. An instruction from an operating unit 114 is supplied to the imaging control unit 113. An operation of the operating unit 114 by a user sets shutter speed and a frame period, and the imaging control unit 113 controls each unit so that an image is taken with the shutter speed and the frame period being set. The setting based on the operation of the operating unit 114 and the like is stored in a memory 115.

A shutter blade 101 is arranged in front of the image sensor included in the imaging unit 103. The shutter blade 101 is a rotating plate that includes an opening 101a and a light shielding portion 101b, and is rotationally driven by a shutter driving unit 102. By rotating the shutter blade 101, there alternately occurs a state in which the opening 101a is located in front of the image sensor and image light is incident and a state in which the light shielding portion 101b is located in front of the image sensor and the image light is shielded. In other words, opening and closing of a shutter are repeated. Rotational driving of the shutter blade 101 by the shutter driving unit 102 is controlled by the imaging control unit 113. In this case, the shutter driving unit 102 supplies a detection signal of a rotation phase of the shutter blade 101 detected by a shutter rotation detection sensor 102a to the imaging control unit 113.

An image signal output from the imaging unit 103 is supplied to a signal processing unit 104. The signal processing unit 104 performs various types of signal processings on the supplied image signal and converts the image signal into image data in a prescribed format for output. The image data in the prescribed format obtained at the signal processing unit 104 is supplied to a mixing unit 106. A memory 105 is connected to the signal processing unit 104. The signal processing unit 104 performs a temporary storage processing necessary for an image data processing and performs a correction processing on output timing of the image data. The image signal output from the imaging unit 103 may be directly supplied to the mixing unit 106 as the image data for output without performing a format conversion of the image data at the signal processing unit 104.

The mixing unit 106 performs a processing to add synchronizing data generated at an external synchronization generator 107 to the supplied image data. An audio signal input to an audio signal input terminal 192 is delayed at an audio delaying unit 108 to cause timing of the audio signal to agree with that of the image data, and the audio signal is supplied to the mixing unit 106 to be added to the image data. The mixing unit 106 supplies the image data to which the synchronizing data and audio data are added to a video output terminal 191, and the image data is output from the video output terminal 191 to outside. The image data (video data) to be output from the video output terminal 191 may be a digital signal or an analog signal; however, a digital signal is used for the following explanation. When there is no input of the audio signal to the audio signal input terminal 192, an audio signal mixing processing at the mixing unit 106 is not performed.

The external synchronization generator 107 generates the synchronizing data, which is output from a synchronizing signal output terminal 193 to outside. The synchronizing data generated at the external synchronization generator 107 is synchronizing data that is in synchronization with the image data output from the video output terminal 191. Data designating imaging timing and exposure timing is added to the synchronizing data output from the synchronizing signal output terminal 193. The imaging timing is timing at which imaging is started at the imaging unit 103. An exposure period is data of a period in which light is exposed by the shutter blade 101, and for example, is data indicating an open angle of the shutter blade 101, which is an angle of the opening 101a. Details on a state of addition of the data designating the imaging timing and the exposure period will be described later.

Further, the imaging device 100 includes a synchronizing signal input terminal 194, and when the synchronizing data is input to the synchronizing signal input terminal 194, the obtained synchronizing data is supplied to an external synchronization extracting unit 111 and an imaging synchronization extracting unit 112. The external synchronization extracting unit 111 detects synchronizing timing such as a vertical blanking period and a horizontal blanking period from the supplied synchronizing data. Then, the data indicating the timing detected by the external synchronization extracting unit 111 is supplied to the signal processing unit 104.

When the data of the synchronizing timing is supplied from the external synchronization extracting unit 111, the signal processing unit 104 outputs the image data from the video output terminal 191 in synchronization with the timing.

When the data designating the imaging timing and the exposure period is added to the synchronizing data input to the synchronizing signal input terminal 194, a processing for extracting the data designating the imaging timing and the exposure period is performed at the imaging synchronization extracting unit 112.

When the data designating the imaging timing and the exposure period is extracted at the imaging synchronization extracting unit 112, the data designating the imaging timing and the exposure period that is extracted is supplied to the imaging control unit 113. The imaging control unit 113 controls the imaging unit 103 so that an image is taken in accordance with the supplied imaging timing. In addition, the imaging control unit 113 controls the shutter driving unit 102 so that the shutter blade 101 is opened and closed in association with the data of the exposure period that is supplied.

The imaging device 100 includes an analog shutter pulse input terminal 195. Analog shutter pulse obtained at the input terminal 195 has analog voltage waveform generated at another imaging device or an external shutter pulse generator. The analog shutter pulse obtained at the input terminal 195 is supplied to a pulse generation unit 116. The pulse generation unit 116 generates driving pulse that is in synchronization with the supplied analog shutter pulse, and supplies the generated driving pulse to the imaging control unit 113. Also, the analog shutter pulse obtained at the input terminal 195 is supplied to a counter 117, a count processing in synchronization with the analog shutter pulse is performed, and the count result is supplied to the imaging control unit 113. The counter 117 performs a count operation for detecting a frame period of the analog shutter pulse and a count operation for detecting an exposure period (open angle of shutter) of the analog shutter pulse. Processings when the analog shutter pulse is input to the input terminal 195 will be described later with reference to FIG. 6 and the subsequent drawings.

By using the two imaging devices 100 shown in FIG. 1, it is possible to take a stereoscopic image. That is, when a stereoscopic image is taken, two imaging devices are fixed by a coupling mechanism (not shown) such as a rig, and an image is taken so that optical axes of a lens unit 200 attached to each imaging device become parallel to each other. An image for left channel is taken by one imaging device and an image for right channel is taken by the other imaging device.

When the two imaging devices 100 are used to take a stereoscopic image like this, the synchronizing signal output terminal 193 of one imaging device and the synchronizing signal input terminal 194 of the other imaging device are connected to each other via a cable. The synchronizing data and the like are transmitted between the two imaging devices via the connected cable to execute a synchronized imaging.

When the two imaging devices are connected, here, the imaging device that outputs the synchronizing data from the synchronizing signal output terminal 193 is assumed to be a master imaging device, and the imaging device in which the synchronizing data is input from the synchronizing signal input terminal 194 is assumed to be a slave imaging device.

[2. Example of Processing by Master Imaging Device]

Next, an example of a processing at each imaging control unit 113 in the case where the two imaging devices 100 are used and the synchronizing signal output terminal 193 of one imaging device and the synchronizing signal input terminal 194 of the other imaging device are connected to each other via a cable.

Figure 2:
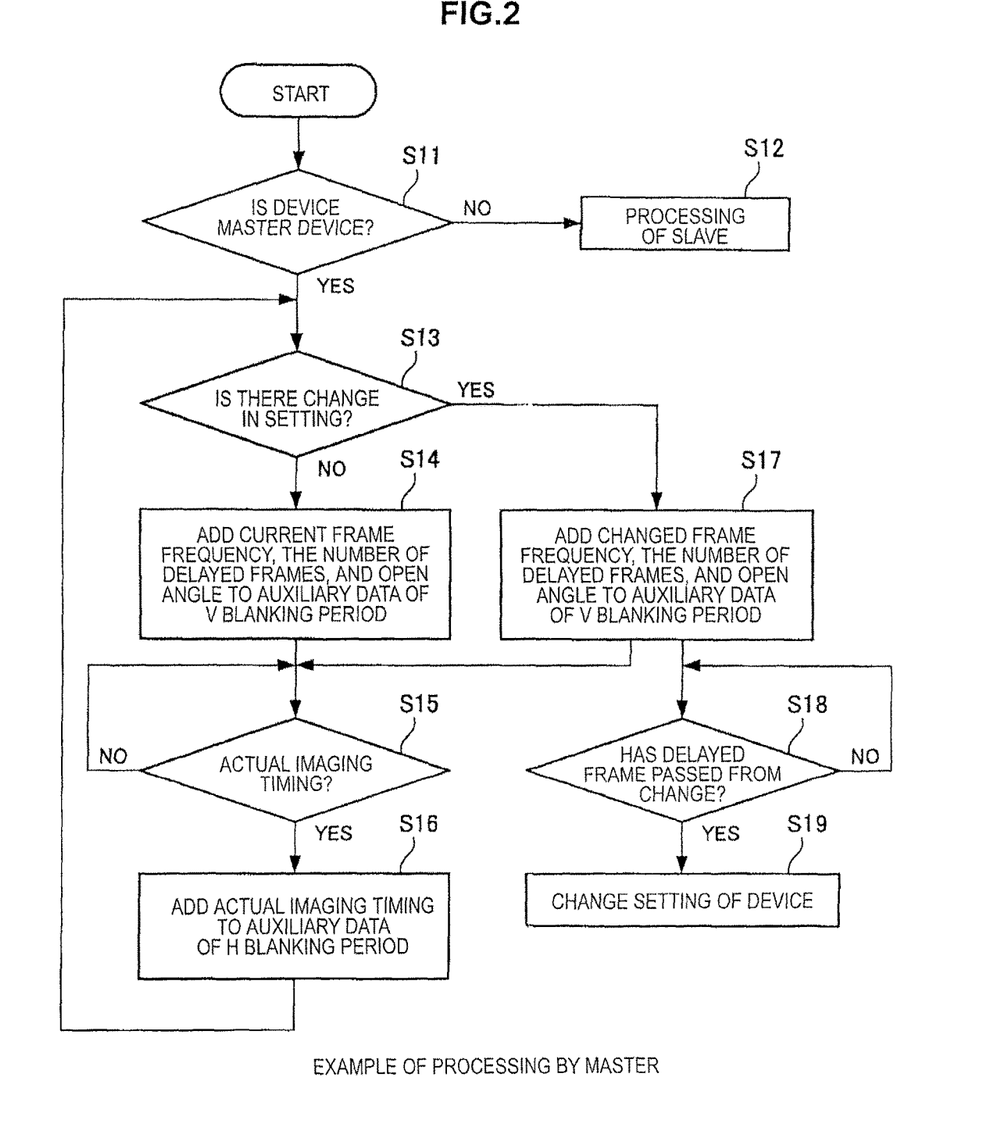
FIG. 2 is a flow chart showing an example of a processing by a master imaging device according to an embodiment of the present disclosure.

Referring now to the flow chart of FIG. 2, an example of a control processing at the imaging control unit 113 of the master imaging device is described. The master imaging device is the imaging device that outputs the synchronizing data from the synchronizing signal output terminal 193.

First, it is determined whether the imaging device is a master imaging device or a slave imaging device (Step S11). When it is determined that the imaging device is a slave imaging device, other processings are carried out (Step S12). The processings in the case where the imaging device is a slave imaging device will be described later with reference to FIG. 3.

When it is determined in Step S11 that the imaging device is a master imaging device, it is determined whether there has been a change in a setting of an imaging state (Step S13). When it is determined that there has been no change in the setting of the imaging state, a processing is performed to add data of current imaging frame frequency, number of delayed frames, and open angle of a shutter to the vertical blanking period of the synchronizing data generated at the external synchronization generator 107 (Step S14). For example, assume that the image data output from the imaging device 100 is digital video data of SDI standard and the synchronizing data output from the synchronizing signal output terminal 193 is also the synchronizing data of the digital video data of SDI standard. At that time, each data described above is added to auxiliary data of the vertical blanking period specified by SDI standard. The vertical blanking period of the synchronizing data is data specifying a frame period or a field period of output image data.

The imaging frame frequency added to the synchronizing data in the processing of Step S14 is frame frequency upon taking an image by the imaging unit 103 and not frame frequency of the image data output from the video output terminal 191. The frame frequency of the image data output from the video output terminal 191 is fixed at certain frequency dependent on an output format.

The number of delayed frames indicates the number of delayed frames between taking an image by the imaging unit 103 and output of the image data from the video output terminal 191.

The open angle of the shutter is an angle of the opening 101*a* of the shutter blade 101. The data is data indicating the setting of the current imaging state at the imaging control unit 113.

After a processing for adding the data to the synchronizing data of the vertical blanking period is performed in Step S14, it is determined whether it has come to timing to actually take an image by the imaging unit 103 (Step S15), and wait until the timing to actually take an image has come. In the following explanation, the timing to actually take an image by the imaging unit 103 is referred to as actual imaging timing.

When it is determined in Step S15 that the actual imaging timing has come, data indicating that the actual imaging timing has come is added to the auxiliary data of the horizontal blanking period of the timing that agrees with the actual imaging timing (Step S16). The horizontal blanking period of the synchronizing data is data specifying a period of a horizontal line of the image data.

After the data of the actual imaging timing is added in Step S16, it returns to the determination of Step S13.

When it is determined in Step S13 that there has been a change in the setting of the imaging state, data of changed imaging frame frequency, number of delayed frames, and open angle of the shutter is added to the vertical blanking period of the synchronizing data generated at the external synchronization generator 107 (Step S17). Here, the change of the setting means a change in a user's operation of the operating unit 114 or a change of the analog shutter pulse input to the analog shutter pulse input terminal 195.

Then, after a processing to add is performed in Step S17, it goes to the determination of Step S15. The actual imaging timing determined in Step S15 after the processing of Step S17 is the actual imaging timing after change.

Thereafter, processings are performed in the same manner as the case where there has been no change.

After the changed data is added in Step S17, it is determined whether the number of delayed frames added to the synchronizing data has passed, and wait until the corresponding delayed frames have passed (Step S18). For example, if the number of delayed frame is 1, wait for 1 frame after change. When it is determined in Step S18 that the delayed frames have passed, the imaging control unit 113 changes the setting for taking an image for own imaging device to a state indicated by the data added in Step S17 (Step S19). In other words, the imaging frame frequency and the open angle of the shutter are changed to those after change.

[3. Example of Processing by Slave Imaging Device]

Next, an example of a control processing by the imaging control unit 113 of the slave imaging device will be described with reference to the flow chart of FIG. 3. The slave imaging device is the imaging device in which the synchronizing data is input to the synchronizing signal input terminal 194.

First, it is determined whether the imaging device is a master imaging device or a slave imaging device (Step S31). When it is determined that the device is a master imaging device, it goes to the processings shown in the flow chart of FIG. 2 described earlier (Step S32).

When it is determined that the device is a slave imaging device, it is determined whether auxiliary data of the vertical blanking period contained in the synchronizing data input to the synchronizing signal input terminal 194 has been received (Step S33). When it is determined that the auxiliary data of the vertical blanking period has been received, the imaging control unit 113 sets the obtained frame frequency and open angle of the shutter to an image control state of own imaging device.

After that, it is determined whether data of the actual imaging timing added to the horizontal blanking period has been received (Step S35), and wait until the data of the actual imaging timing is received. When the data of the actual imaging timing is received in Step S35, timing to take an image by the image sensor included in the imaging unit 103 is set so as to start taking an image at the timing, and the rotation phase of the shutter blade 101 is made to be a synchronized phase (Step S36). After the imaging timing of the imaging unit 103 and the rotation phase of the shutter blade 101 are set, it returns to the determination of Step S33.

Figure 3:
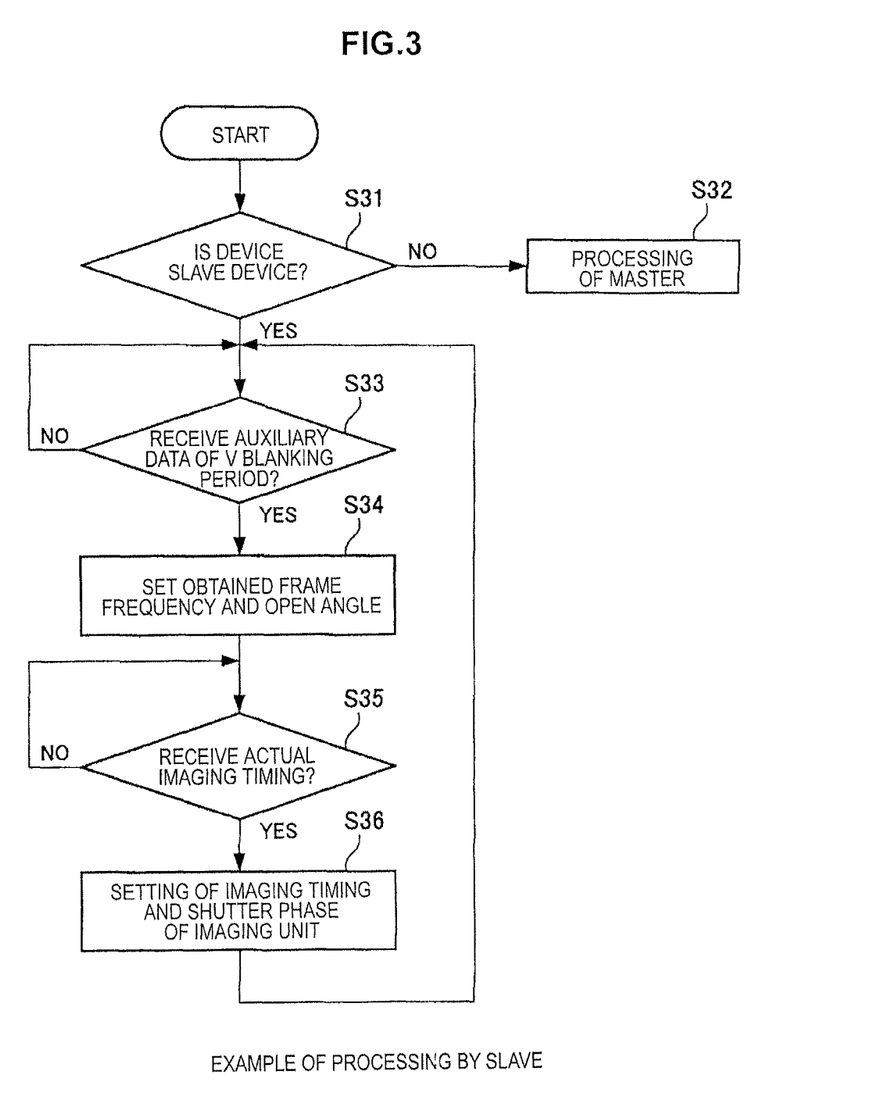
FIG. 3 is a flow chart showing an example of a processing by a slave imaging device according to an embodiment of the present disclosure.

The processings shown in the flow chart of FIG. 2 are performed in the master imaging device and the processings shown in the flow chart of FIG. 3 are performed in the slave imaging device. Accordingly, an image is taken at the synchronized timing between the master imaging device and the slave imaging device, and the rotation phase of the shutter blade 101 is also synchronized. Therefore, the image data output from the video output terminal 191 of the two imaging devices is the one taken at the same timing, and the rotation phase of the shutter blade 101 and the open angle of the master imaging device agree with those of the slave imaging device, which means that the image has been taken under the same condition.

[4. Example of Imaging State]

Next, an example of an actual imaging state will be described with reference to FIGS. 4 to 7.

First, an example in which an image is taken in a state where the number of frames upon taking an image is not changed is shown in FIGS. 4A to 4C. In the example of FIGS. 4A to 4C, light is not shielded at all by the shutter blade 101, and the exposure period (shutter open angle) is 360°.

FIG. 4A shows the imaging timing and the exposure period at the image sensor included in the imaging unit 103. FIG. 4B shows a read out period of a signal from the image sensor. FIG. 4C shows the image data output from the video output terminal 191 and the synchronizing data output from the synchronizing signal output terminal 193. The image data output from the video output terminal 191 and the synchronizing data output from the synchronizing signal output terminal 193 are the data with the same synchronizing timing.

FIGS. 4A to 4C show an example of an imaging at 30 P, that is, an example of a progressive imaging in which an image is taken by frame at 30 Hz of frame frequency.

In addition, as shown in FIG. 4B, the signal is read out from the image sensor at 30 P, which is the same period as the exposure period.

As shown in FIG. 4C, the image data output from the video output terminal 191 performs a conversion transmission, converting the image of 1 frame into the image of 2 fields. That is, an odd number field image ODO including ½ of a horizontal line and an even number field image EVEN including the remaining ½ of the horizontal line are generated from the image of 1 frame. Then, images in each field are sequentially output at 60 Hz of frequency that is two times of 30 Hz of frame frequency. The odd number field image ODO starts to be output when the signal from the image sensor of FIG. 4B has been read out at least for ½ frame. The synchronizing data is added to the image data output from the video output terminal 191. A low level period shown in FIG. 4C is the data of the vertical blanking period. The synchronizing data output from the synchronizing signal output terminal 193 is also the synchronizing data with the same timing.

Then, as for the synchronizing data output from the synchronizing signal output terminal 193, data D1, D2, and D3 are added to the data of the vertical blanking period. Data D1 is frame frequency, and shows 30 P in this example. Data D1 is data designating the frame frequency, but may be data designating a frame period. Data D2 is the number of the delayed frames, and shows 1 frame delay in this example. Data D3 is the shutter open angle, and shows 360° in this example. 360° of shutter open angle means that the shutter is completely open. The frame frequency D1, the number of the delayed frames D2, and the shutter open angle D3 are added to the synchronizing data of the vertical blanking period of each frame (field) to be transmitted.

Data D4 shown in FIG. 4C is data showing the imaging timing, and as shown in FIGS. 4A and 4B, a processing for reading out the image signal of 1 frame accumulated in the image sensor is started at the imaging timing. The data D4 of the imaging timing is added to the horizontal blanking period; however, the horizontal blanking period is a period for each 1 horizontal line, and FIG. 4C only shows the timing in which the data is added and does not show the data of the horizontal blanking period.

The number of the delayed frame 1 shown as the data D2 shows the timing at which a state designated by the data D1 and the data D3 is set, and shows that the setting is made after 1 frame.

Figure 4:
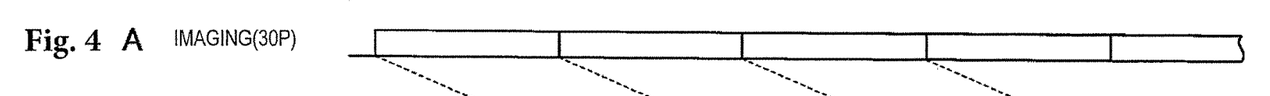
FIGS. 4A to 4C are explanatory diagrams showing an example of an imaging state (example 1 showing an imaging at a certain state) according to an embodiment of the present disclosure.
Figure 5:
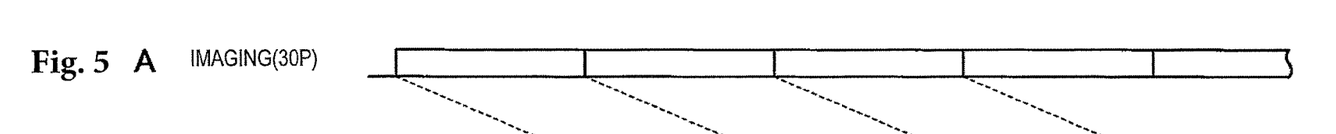
FIGS. 5A to 5C are explanatory diagrams showing an example of an imaging state (example 2 showing an imaging at a certain state) according to an embodiment of the present disclosure.

FIG. 5 shows an example in which the speed of reading out from the image sensor is set to be 60 Hz, which is two times the speed in the example of FIG. 4. An imaging at 30 P, that is, a progressive imaging at 30 Hz of frame frequency, is performed as shown in FIG. 5A, and reading out of the signal from the image sensor is performed at 60 P (60 Hz), which is half of the exposure period, as shown in FIG. 5B. Segments with diagonal lines in FIG. 5B are periods where reading out is not performed.

The image data that has been subjected to field conversion output from the video output terminal 191 sequentially outputs images in each field at 60 Hz of frequency, which is two times of 30 Hz of frame frequency.

In the case of the example of FIG. 5, output of the odd number field image ODO can be started immediately after reading out of the signal from the image sensor shown in FIG. 5B is started. Therefore, as compared with the example of FIG. 4, output is performed earlier by about 1 field period.

Figure 6:
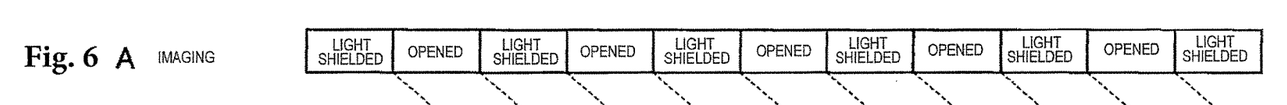
FIGS. 6A to 6C are explanatory diagrams showing an example of an imaging state (example 3 showing an imaging at a certain state) according to an embodiment of the present disclosure.

In the example of FIG. 6, the exposure period (shutter open angle) upon taking an image is set to be 180° as compared with the example of FIG. 5. That is, the 180° period immediately before the timing at which an imaging is indicated by the imaging timing D4 is an opening period of the shutter, and the shutter is closed for the remaining period.

Then, as shown in FIG. 6B, reading out is performed at 60 Hz of frequency at the timing indicated by the imaging timing D4. In this example, the period in which the shutter is closed and the read out period agree with each other.

The image data that has been subjected to field conversion output from the video output terminal 191 sequentially outputs images in each field at 60 Hz of frequency as shown in FIG. 6C.

Figure 7:
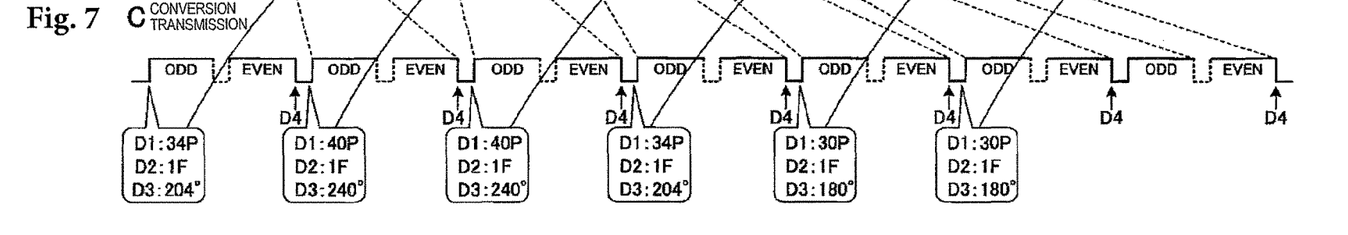
FIGS. 7A to 7C are explanatory diagrams showing an example of an imaging state (example of a variable imaging) according to an embodiment of the present disclosure.

Each example in FIGS. 4 to 6 shows a state where there is no change in the imaging state. On the other hand, when a variable imaging is performed, the state is as shown in FIG. 7, for example. FIG. 7 shows a state, as an initial state, in which an image is taken at 30 P (30 Hz) of frame frequency with the shutter open angle being 180°. From this state, the frame frequency is changed from 30 P to 34 P, 40 P, 34 P, and then to 30 Hz.

The data of the frame frequency D1 added to the synchronizing data shown in FIG. 7C transmits the setting (change) of the frame frequency described above. In this example, the frame delay D2 is 1 frame, and the actual exposure period shown in FIG. 7B is set to the corresponding frequency (period) 1 frame after an instruction by the data D1 added to the synchronizing data of FIG. 7C.

In the example of FIG. 7A, the shutter open angle is set to be 180° when an image is taken at 30 P of frame frequency, the shutter open angle is set to be 240° when an image is taken at 34 P of frame frequency, and the shutter open angle is set to be 204° when an image is taken at 40 P of frame frequency. By changing the shutter open angle and the frame frequency like this, the exposure period when imaging each frame is made to be the same, and the exposure period of each frame can be set to be the same.

Then, as shown in FIG. 7C, the image data that has been subjected to field conversion is output at 60 Hz of constant frequency. Therefore, the horizontal line to which the data D4 designating the imaging timing is inserted varies for each imaging frame, and the phase between an imaging and output of the image data also changes in association with the change of the imaging frequency.

Even when there is a change in the setting regarding the imaging timing, the master imaging device and the slave imaging device synchronize with each other, and an image can be taken with the shutter phase and the imaging timing of the master imaging device agreeing with those of the slave imaging device.

[5. Example when Analog Shutter Pulse is Input]

Next, an example in which analog shutter pulse is input to the analog shutter pulse input terminal 195 included in the imaging device 100 will be described.

Figure 8:
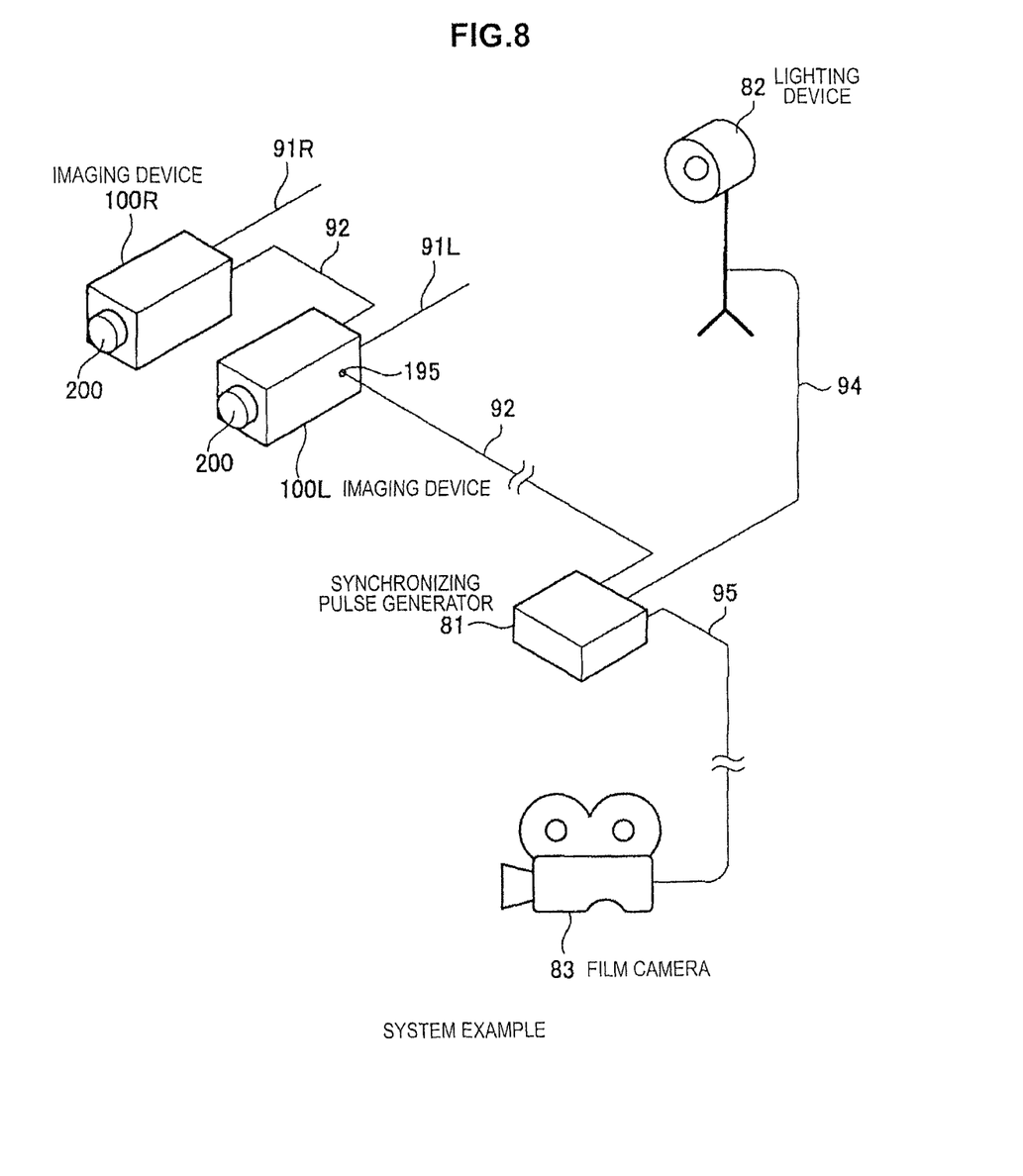
FIG. 8 is a diagram illustrating an example of a system that uses an imaging device according to an embodiment of the present disclosure.

FIG. 8 is a diagram illustrating an example of a system configuration in which analog shutter pulse is used. In the example of FIG. 8, two imaging devices, that is, an imaging device for left channel 100L and an imaging device for right channel 100R are used. The imaging devices 100L and 100R for each channel are the same as the imaging device 100 shown in FIG. 1.

A synchronizing signal output terminal 193 of the imaging device for left channel 100L and a synchronizing signal input terminal 194 of the imaging device for right channel 100R are connected via a cable 92. By making a connection like this, the imaging device for left channel 100L will be master and the imaging device for right channel 100R will be slave as explained earlier; therefore, an image can be taken with the shutter phase and the imaging timing of the imaging device 100L agreeing with those of the imaging device 100R.

Then, image data for left channel and image data for right channel are output from cables 91L and 91R connected to video output terminals 191 of the two imaging devices 100L and 100R.

Then, a synchronizing pulse generator 81 is used, and analog shutter pulse is supplied from the synchronizing pulse generator 81 to an analog shutter pulse input terminal 195 of the imaging device for left channel 100L via a cable 93. The synchronizing pulse generator 81 generates analog shutter pulse that is in synchronization with a connected apparatus.

As shown in FIG. 8, a lighting device 82 is connected to the synchronizing pulse generator 81 via a cable 94, and a film camera 83 is connected to the synchronizing pulse generator 81 via a cable 95. The synchronizing pulse generator 81 generates analog shutter pulse that is in synchronization with a lighting period of light of the lighting device 82 and a filming period of a movie film at the film camera 83.

By adopting the system configuration shown in FIG. 8, an image is taken by the two imaging devices 100L and 100R at timing in association with the lighting period of the light of the lighting device 82 and the filming period at the film camera 83.

FIG. 9 is a diagram showing an example of analog shutter pulse. The analog shutter pulse shown in FIG. 9A has pulse waveform in which changes of high level and low level are repeated by 1 frame period, and the high level period indicates that the shutter is open and the low level period indicates that the shutter is closed. The analog shutter pulse shown in FIG. 9B is an example in which high level and low level are inverted with respect to the analog shutter pulse shown in FIG. 9A, and the low level period indicates that the shutter is open and the high level period indicates that the shutter is closed.

Figure 9A:
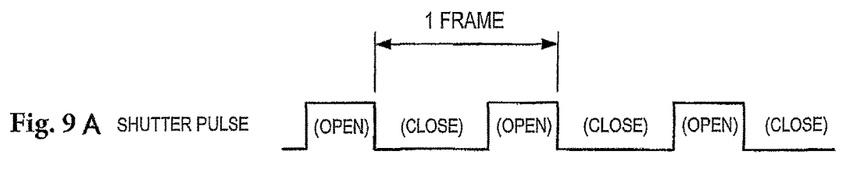
FIGS. 9A to 9E are timing diagrams showing an example of analog shutter pulse according to an embodiment of the present disclosure.
Figure 9B:
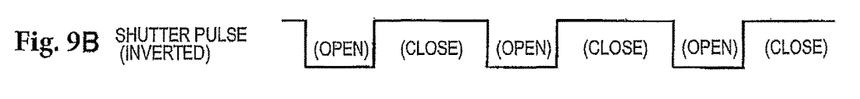
Figure 9C:
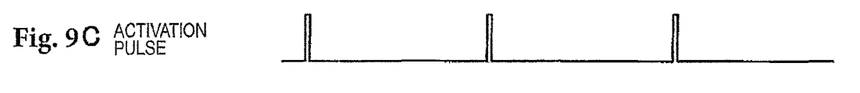

Such analog shutter pulse is supplied from the analog shutter pulse input terminal 195 of the imaging device 100 to the pulse generation unit 116 (FIG. 1); accordingly, driving pulse shown in FIG. 9C is generated. The driving pulse shown in FIG. 9C is pulse that rises at timing where the shutter is opened from the closed state by the analog shutter pulse.

Figure 9D:
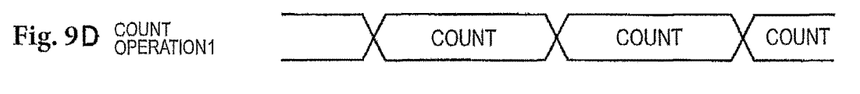
Figure 9E:
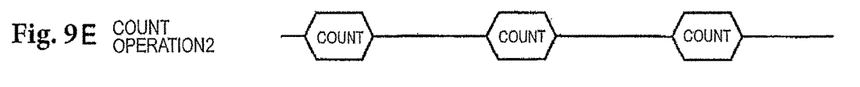

The counter 117 performs a count processing to detect 1 frame period, which is a period between a fall of the analog shutter pulse and the next fall of the analog shutter pulse, as shown in FIG. 9D. Further, the period where the analog shutter pulse is being risen is counted for each frame inside the imaging control unit 113 as shown in FIG. 9E. These count processings are counts with a horizontal period of the image data generated in the imaging device being a unit, for example.

Such driving pulse and the result of the count are supplied from the pulse generation unit 116 to the imaging control unit 113; accordingly, the imaging timing and the exposure timing set by the imaging control unit 113 become timing indicated by the analog shutter pulse. That is, an image is taken in a state where the timing in which the opening 101a of the shutter blade 101 is located in front of the image sensor agrees with the timing of open indicated by the analog shutter pulse shown in FIG. 9A or FIG. 9B. In addition, by an instruction from the imaging control unit 113, the data indicating the imaging timing or the exposure period added to the synchronizing data at the external synchronization generator 107 also becomes data indicating corresponding timing or period. Therefore, an image is taken in synchronization with the analog shutter pulse by the master imaging device 100L to which the analog shutter pulse is input and the slave imaging device 100R.

In addition, the analog shutter pulse is counted for the frame period at the pulse generation unit 116 in the master imaging device 100L. The result of the count is notified from the pulse generation unit 116 to the imaging control unit 113, and it is determined whether the analog shutter pulse input by the imaging control unit 113 is adequate based on the notification.

Figure 10:
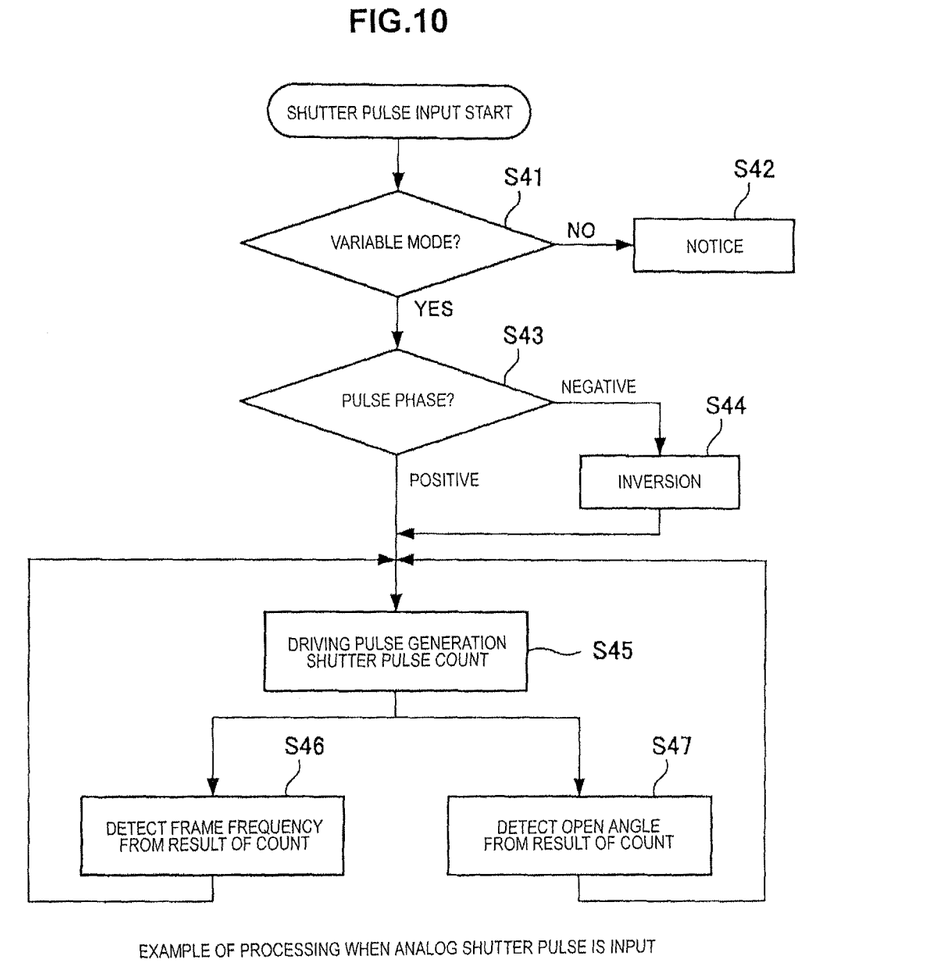
FIG. 10 is a flow chart showing an example of a processing when analog shutter pulse is input according to an embodiment of the present disclosure.

The flow chart of FIG. 10 shows an example of a processing at the imaging control unit 113 when the analog shutter pulse is input.

When the analog shutter pulse is input, it is determined whether the current imaging mode of the imaging device is a variable mode or a fixed mode (Step S41). If it is a fixed mode, a notice is indicated on a view finder or the like (Step S42). This imaging mode is preliminarily set by an operation and the like of the operating unit 114 of the imaging device 100 or the like, and the timing of imaging or exposure is not changed by pulse from outside in the fixed mode.

When it is determined in Step S41 that the variable mode is being set, it is determined whether the input analog shutter pulse is positive pulse or negative pulse (Step S43). Whether the input analog shutter pulse is positive pulse or negative pulse may be automatically determined by the phase of the input pulse, but which pulse to be input may be set by an operation of the operating unit 114 or the like. The positive pulse is the pulse shown in FIG. 9A, for example, and the negative pulse is the pulse shown in FIG. 9B, for example.

When it is determined in Step S43 that the input analog shutter pulse is the positive pulse, the driving pulse shown in FIG. 9C is generated at the pulse generation unit 116 with the phase maintained. When it is determined that the input analog shutter pulse is the negative pulse, the driving pulse is generated after the pulse phase is inverted (Step S44). In addition, a count processing based on the analog shutter pulse is performed at the counter 117 (Step S45).

Then, the imaging control unit 113 determines the frame period indicated by the analog shutter pulse based on the result of the count of the frame period (Step S46) and determines the shutter open angle indicated by the analog shutter pulse based on the result of the count of the shutter open period (Step S47). As input of the analog shutter pulse continues, processings of Steps S45, S46, and S47 are repeated.

The imaging control unit 113 determines whether the frame period and the shutter open angle have values within the appropriate range that can be set by the imaging device 100. For example, the imaging control unit 113 determines whether the frame period is the period that can be set by the imaging device 100 and determines whether the designated shutter open angle can be set within 1 frame period. Based on the respective determinations, control is carried out so that an image is taken in a state where the setting is possible, and if the setting is not possible, it is switched to an imaging at the timing generated inside the imaging device.

However, the shutter pulse, which has analog voltage waveform, may slightly vary due to various causes. When it is detected that the setting is temporarily above the range that can be set, the last setting is maintained. When it is continuously detected several times that the setting is above the range that can be set according to the result of the count of the shutter pulse, it is preferable that it is switched to an imaging at the timing generated inside the imaging device.

Imaging control based on input of the analog shutter pulse makes it possible to carry out an imaging and an exposure at timing in association with the lighting period of the light of the lighting device 82 and the filming period at the film camera 83 as in the system configuration shown in FIG. 8.

[6. Modification]

In the example of FIG. 1, setting regarding an imaging can be changed by an operation of the operating unit 114 included in the imaging device 100. On the other hand, the setting may be changed by an instruction from a remote controller by connecting the remote controller to the master imaging device 100, for example.

In the embodiment described above, the data of imaging timing, the exposure period of the shutter, and the frame delay is added; however, only one or two of these may be added.

In the embodiment described above, the imaging device including the shutter mechanism that has the shutter blade is shown as an example. On the other hand, a control of an electronic shutter function may be carried out by a similar processing when the image sensor included in the imaging unit has the electronic shutter function. When the electronic shutter function is provided, a period in which a pixel arranged in the image sensor receives a signal will be the exposure period.

In the system shown in FIG. 8, an example in which the analog shutter pulse is generated in the synchronizing pulse generator 81 located outside and synchronized with the external apparatus. On the other hand, when the two imaging devices are synchronized with each other (for example, synchronization between the imaging devices 100L and 100R shown in FIG. 6), the synchronization may be achieved by similar analog shutter pulse transmission. In this case, the synchronization can be achieved by a configuration in which the analog shutter pulse is generated in the imaging device 100 shown in FIG. 1 and the generated analog shutter pulse is output.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An imaging device comprising:

an imaging unit converting an image light incident through a lens to an electrical image signal in a set imaging timing and exposure period;

a signal processing unit processing the image signal output from the imaging unit to obtain an image data for output;

an output portion outputting the image data obtained at the signal processing unit;

a terminal portion for synchronization connecting with another imaging device; and an imaging control unit controlling the imaging timing at the imaging unit and transmitting data of the imaging timing and data of the exposure period at the imaging unit to the other imaging device through the terminal portion for synchronization.

(2)

The imaging device according to (1), wherein the imaging control unit adds data of a frame period or a frame frequency at which an image is taken to data output from the terminal portion for synchronization and takes an image at the imaging unit at the added frame period or frame frequency.

(3)

The imaging device according to (1) or (2), wherein the imaging control unit adds data of a delayed period until the imaging timing is applied to the data of the imaging timing transmitted from the terminal portion for synchronization and performs a setting of the imaging timing at the imaging unit after waiting for a period indicated by data of the period.

(4)

The imaging device according to any one of (1) to (3), wherein the data output from the terminal portion for synchronization is synchronizing data that is in synchronization with the image data output from the output portion and the data of the imaging timing and the data of the exposure period are added to the synchronizing data.

(5)

The imaging device according to any one of (1) to (4), wherein the data of the imaging timing is added to a horizontal blanking period of the synchronizing data.

(6)

The imaging device according to any one of (1) to (5) comprising:

a shutter mechanism unit arranged in an optical path between the lens and the imaging unit, wherein the data of the exposure period is data indicated by an open angle of the shutter mechanism unit.

(7)

The imaging device according to any one of (1) to (6) comprising:

an input terminal for an analog shutter pulse, wherein the imaging control unit sets the imaging timing and the exposure period at the imaging unit based on the analog shutter pulse input to the input terminal for the analog shutter pulse.

(8)

The imaging device according to any one of (1) to (7), wherein the imaging control unit sets the imaging timing and the exposure period at the imaging unit based on received data when the data of the imaging timing and the data of the exposure period are received via the terminal portion for synchronization.

The present disclosure contains subject matter related to that disclosed in Japanese Priority Patent Application JP 2011-127414 filed in the Japan Patent Office on Jun. 7, 2011, the entire content of which is hereby incorporated by reference.

What is claimed is:

1. A video imaging device comprising:
an image sensor exhibiting an adjustable image sensor exposure period and configured to convert an image light into an image signal including frames captured at a frame frequency; a shutter arranged in front of the image sensor;
an input terminal that inputs synchronizing data from an external device, the synchronizing data representing an image sensor exposure period from a timing at which imaging each frame is started by the image sensor to a timing at which the image sensor reads out the image signal; and
an imaging control section configured to control an imaging operation of the image sensor based on the synchronizing data,
wherein the image sensor exposure period is a function of the frame frequency of each frame of the image signal, with the frame frequency being adjustable so as to increase with an increase in the image sensor exposure period and to decrease with a decrease in the image sensor exposure period, and wherein the image sensor exposure period represents a shutter open angle for each frame imaged by the image sensor.

2. The video imaging device according to claim 1, wherein the imaging control section is configured to control a shutter driver based on the synchronizing data.

3. The video imaging device according to claim 1, wherein the image sensor is configured to accumulate the image signal during the image sensor exposure period.

4. The video imaging device according to claim 1, wherein the imaging control section is configured to determine whether the video imaging device is a master imaging device or a slave imaging device.

5. The video imaging device according to claim 1, wherein the image signal represents a part of a stereoscopic image.

6. The video imaging device according to claim 1, wherein the video imaging device is configured to perform a variable speed imaging based on the synchronizing data, in which the frame frequency of the imaging is changed.

7. The video imaging device according to claim 6, wherein the synchronizing data represents number of delayed frames before the frame frequency is changed by the synchronizing data.

8. The video imaging device according to claim 1, wherein the synchronizing data has a horizontal blanking period having data specifying the timing at which the imaging each frame is started by the image sensor.

9. A video imaging device comprising:
an image sensor exhibiting an adjustable image sensor exposure period and configured to convert an image light into an image signal including frames captured at a frame frequency;
a shutter arranged in front of the image sensor;
an output terminal that outputs synchronizing data to an external device,
wherein the synchronizing data represents an image sensor exposure period from a timing at which imaging each frame is started by the image sensor to a timing at which the image sensor reads out the image signal; and
an imaging control section configured to control the image sensor based on the synchronizing data, wherein the image sensor exposure period is a function of the frame frequency of each frame of the image signal, with the frame frequency being adjustable so as to increase with an increase in the image sensor exposure period and to decrease with a decrease in the image sensor exposure period, and wherein the image sensor exposure period represents a shutter open angle for each frame imaged by the image sensor.

10. The video imaging device according to claim 9, wherein the imaging control section is configured to control a shutter driver based on the synchronizing data.

11. The video imaging device according to claim 9, wherein the image sensor is configured to accumulate the image signal during the image sensor exposure period.

12. The video imaging device according to claim 9, wherein the synchronizing data represents a frame frequency of the imaging each frame and a shutter open angle each frame.

13. The video imaging device according to claim 12, wherein the image sensor exposure period is based on the frame frequency of the imaging each frame, the shutter open angle each frame, and the timing at which imaging each frame is started by the image sensor.

14. The video imaging device according to claim 9, wherein the imaging control section is configured to determine whether the video imaging device is a master imaging device or a slave imaging device.

15. The video imaging device according to claim 9, wherein the image signal represents a part of a stereoscopic image.

16. The video imaging device according to claim 9, wherein the video imaging device is configured to perform a variable speed imaging in which the frame frequency of the imaging is changed.

17. The video imaging device according to claim 9, wherein the synchronizing data represents number of delayed frames.

18. The video imaging device according to claim 9, wherein the synchronizing data has a horizontal blanking period having data specifying the timing at which the imaging of each frame is started by the image sensor.

19. A video imaging system comprising:
a first video imaging device including
   a first image sensor exhibiting an adjustable image sensor exposure period and configured to convert an image light into a first image signal including frames captured at a frame frequency;
   a first shutter arranged in front of the first image sensor; and
   an output terminal that outputs synchronizing data; and
a second video imaging device including
a second image sensor exhibiting an adjustable image sensor exposure period and configured to convert an image light into a second image signal including frames captured at a frame frequency;
a second shutter arranged in front of the second image sensor;
   an input terminal that inputs, from the first video imaging device, the output synchronizing data, and
   an imaging control section configured to control an imaging operation based on the output synchronizing data,
   wherein the output synchronizing data represents an image sensor exposure period from a timing at which imaging each frame is started by the second image sensor to a timing at which the second image sensor reads out the second image signal, wherein the image sensor exposure period is a function of the frame frequency of each frame of the second image signal, with the frame frequency being adjustable so as to increase with an increase in the image sensor exposure period and to decrease with a decrease in the image sensor exposure period, and wherein the image sensor exposure period represents a shutter open angle for each frame imaged by the second image sensor.

20. An imaging control method by a video imaging device comprising:
   inputting synchronizing data from an external device, the synchronizing data representing an image exposure period from a timing at which imaging each frame is started by an image sensor of the video imaging device having a shutter arranged in front of the image sensor to a timing at which the image sensor reads out an image signal, the image sensor exhibiting an adjustable image sensor exposure period and configured to convert an image light into the image signal including frames captured at a frame frequency; and
   controlling an imaging operation of the video imaging device based on the synchronizing data,
   wherein the image sensor exposure period is a function of a frame frequency of each frame of the image signal, with the frame frequency being adjustable so as to increase with an increase in the image sensor exposure period and to decrease with a decrease in the image sensor exposure period, and wherein the image sensor exposure period represents a shutter open angle for each frame imaged by the image sensor.

\* \* \* \* \*